(12) United States Patent
Surnilla et al.

(10) Patent No.: US 8,096,920 B2
(45) Date of Patent: *Jan. 17, 2012

(54) TRANSMISSION SCHEDULING FOR MULTI-STROKE ENGINE

(75) Inventors: Gopichandra Surnilla, West Bloomfield, MI (US); David Karl Bidner, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 837 days.

This patent is subject to a terminal disclaimer.

(21) Appl. No.: 12/146,235

(22) Filed: Jun. 25, 2008

(65) Prior Publication Data

US 2009/0325761 A1    Dec. 31, 2009

(51) Int. Cl.
*B60W 10/04* (2006.01)
(52) U.S. Cl. ........................................ 477/107
(58) Field of Classification Search .................. 477/107, 477/109; 123/21
See application file for complete search history.

(56) References Cited

U.S. PATENT DOCUMENTS

| | | | |
|---|---|---|---|
| 4,392,549 A | 7/1983 | Wrobel et al. | |
| 5,022,353 A | 6/1991 | Kamamura | |
| 5,113,805 A | 5/1992 | Kawamura | |
| 5,158,044 A | 10/1992 | Kawamura | |
| 5,944,765 A * | 8/1999 | Saito et al. | 701/54 |
| 6,257,176 B1 | 7/2001 | Shimasaki et al. | |
| 6,971,338 B2 | 12/2005 | Kobayashi et al. | |
| 7,036,465 B2 | 5/2006 | Burk et al. | |
| 7,048,671 B2 * | 5/2006 | Morisawa et al. | 477/109 |
| 7,082,898 B2 * | 8/2006 | Kitamura et al. | 123/21 |
| 7,128,043 B2 * | 10/2006 | Lewis et al. | 123/198 F |
| 2004/0235617 A1* | 11/2004 | Saitou et al. | 477/109 |
| 2005/0001480 A1* | 1/2005 | Tabata et al. | 303/141 |
| 2007/0032340 A1* | 2/2007 | Hrovat et al. | 477/107 |
| 2009/0325764 A1 | 12/2009 | Surnilla et al. | |
| 2010/0012053 A1* | 1/2010 | Surnilla et al. | 123/21 |

OTHER PUBLICATIONS

U.S. Appl. No. 12/146,238, filed Jun. 25, 2008, Surnilla et al.

* cited by examiner

*Primary Examiner* — Roger Pang
(74) *Attorney, Agent, or Firm* — Allan J. Lippa; Alleman Hall McCoy Russell & Tuttle LLP

(57) ABSTRACT

An approach is described that coordinates transmission shifting with changing between two-stroke and four-stroke combustion to improve shift and drive performance. In one example, responsive to a driver tip-in, the system may transition the engine to a two-stroke combustion mode from the four-stroke mode and increase a transmission gear ratio in order to avoid transmission shifts during the subsequent acceleration.

12 Claims, 7 Drawing Sheets

TRANSMISSION SCHEDULING FOR MULTI-STROKE ENGINE

BACKGROUND AND SUMMARY

Some internal combustion engines may be operated in a four stroke mode, whereby the engine is operated to perform a combustion cycle once every four piston strokes. Other internal combustion engines may be operated in a two stroke mode, whereby the engine is operated to perform a combustion cycle once every two piston strokes. Engines may produce greater maximum torque when operated in the two stroke mode as compared to the four stroke mode since the combustion frequency and therefore the power density of the engine may be greater in the two stroke mode than the four stroke mode. However, engines may demonstrate greater fuel efficiency when operated in the four stroke mode as compared to the two stroke mode, due in part to better air and fuel mixing before combustion of the charge is initiated.

Improvements in valve actuation systems have enabled engines to be operated in the two stroke mode under some conditions and the four stroke mode in other conditions. This approach has enabled improvements in both fuel efficiency and increased maximum torque of the engine. However, the inventors herein have identified some issues with the this approach. As one example, transmission shifting may be increased as a result of the multi-mode engine capability. Increased transmission shifting may result in reduce fuel efficiency, increased transmission wear, and reduced drivability of the vehicle as the transmission shifts may be perceived by the vehicle operator.

The inventors have recognized that transmission shifting may be reduced in some examples by a method of operating a propulsion system for a vehicle, where the propulsion system includes an internal combustion engine coupled to one or more drive wheels of the vehicle via a transmission. As a non-limiting example, the method includes: operating the engine to produce an engine output; transferring the engine output to one or more drive wheels of the vehicle via the transmission; and adjusting a number of strokes performed by the engine per combustion cycle while shifting the transmission between different gear ratios. For example, the engine may be transitioned from the four stroke mode to the two stroke mode while the transmission is up-shifted by reducing the gear ratio of the transmission. In this way, the transmission may be shifted by a greater extent (e.g. to a higher gear ratio) than would otherwise be suitable when the engine is operated in the four stroke mode, while the new gear ratio may be suitable if the engine is transitioned to the two stroke mode providing increased maximum torque potential.

The inventors herein have further recognized that the engine lug limit (i.e. the lower speed limit of the engine where NVH becomes unacceptable) may differ depending on whether the engine is operating in the four stroke mode or the two stroke mode. For example, the inventors have recognized that the lug limit may be lower in the two stroke mode than the four stroke mode as a result of the increased combustion frequency of two stroke operation. As such, a method of operating a propulsion system for a vehicle is described. When the engine is rotating at a lower engine rotational speed, the vehicle speed may be reduced by increasing a number of strokes performed by the engine per combustion cycle while increasing a gear ratio of the transmission; and when the engine is rotating at a higher engine rotational speed, the vehicle speed may be reduced by reducing a number of strokes performed by the engine per combustion cycle while maintaining the transmission at a selected gear ratio.

In this way, transmission shifting during deceleration of the vehicle may be delayed or eliminated, under some conditions, by transitioning the engine from the four stroke mode to the two stroke mode as the engine rotational speed approaches the lug limit of the engine operating in the four stroke mode rather than performing a transmission shift. The use of coordinated mode transitions may enable the transmission may remain in the selected gear ratio for a longer period of time during deceleration of the vehicle, thereby enabling a subsequent up-shift of the transmission to be eliminated when the vehicle operator requests acceleration of the vehicle.

DETAILED DESCRIPTION

Figure 1:
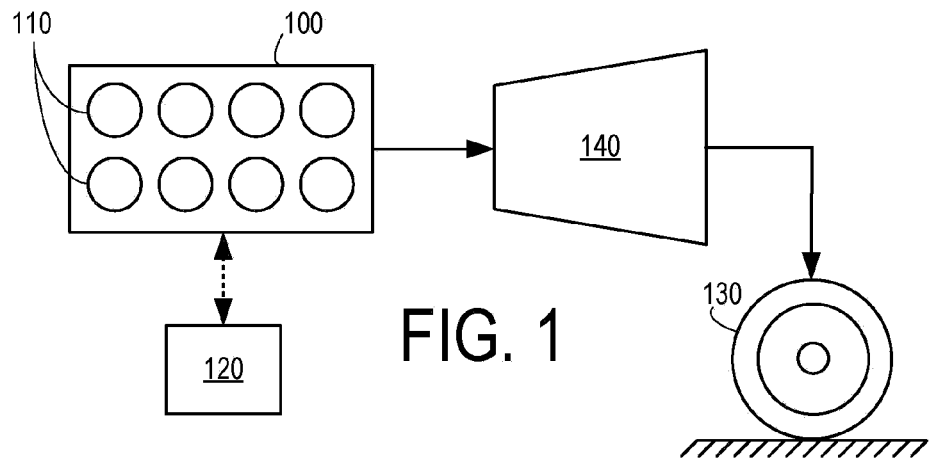
FIG. 1 illustrates an example propulsion system for a vehicle.

FIG. 1 illustrates a propulsions system for a vehicle including an internal combustion engine 100. Engine 100 may be operatively coupled with one or more vehicle drive wheels indicated schematically at 130 via a transmission 140. Engine 100 may include one or more combustion chambers or cylinders 110, a non-limiting example of which is depicted schematically in FIG. 8. In the example propulsion system of FIG. 1, engine 100 includes a total of eight cylinders. Engine 100 may include other suitable numbers of cylinders in other embodiments, including 2, 3, 4, 5, 6, 10, or 12 cylinders. A control system 120 may be operatively and communicatively coupled with engine 100 as well as transmission 140, drive wheel 130, and other suitable components of the vehicle propulsion system.

In some embodiments, transmission 140 may be configured as a continuously variable transmission (CVT), whereby the gear ratio of the transmission may be increased or decreased continuously across a gear ratio range. In other embodiments, transmission 140 may include a plurality of discrete gear ratios that may be selected by the vehicle operator or the control system. For example, the gear ratio of the transmission may be adjusted by shifting the transmission between two or more of the discrete gear ratios provided by the transmission.

Engine cylinders 110 may be selectively operated one of a plurality of different combustion modes depending on operating conditions encountered by the propulsion system. As a non-limiting example, engine cylinders 110 may be operated in a two stroke cycle under some conditions, and may be operated in a four stroke cycle under other conditions. A two stroke mode corresponds to a combustion cycle where two piston strokes are utilized to carry out combustion, whereas a four stroke mode corresponds to a combustion cycle where four piston strokes are utilized to carry out combustion.

Figure 7A:
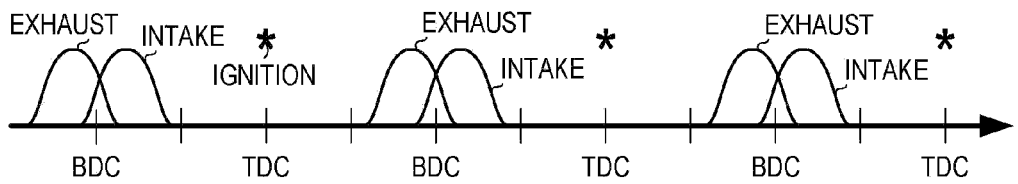
FIGS. 7A and 7B show example timelines depicting operation of an example cylinder of the propulsion system in a two stroke cycle and a four stroke cycle, respectively.
Figure 7B:
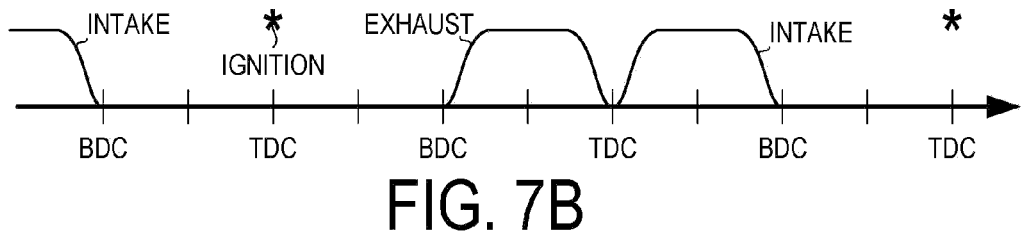

Since combustion occurs ever two piston strokes in the two stroke mode, the engine can produce substantially greater engine torque in the two stroke mode as compared to the four stroke mode. Specifically, the relative combustion frequency and power density of the engine may be increased by transitioning the engine from the four stroke mode to the two stroke mode. Conversely, the relative combustion frequency and power density of the engine may be reduced by transitioning the engine from the two stroke mode to the four stroke mode. An example of each of these modes is depicted in FIGS. 7A and 7B, respectively. In other embodiments, the engine cylinders may be configured to operate in other or different combustion modes, including six stroke modes or eight stroke modes.

Figure 2:
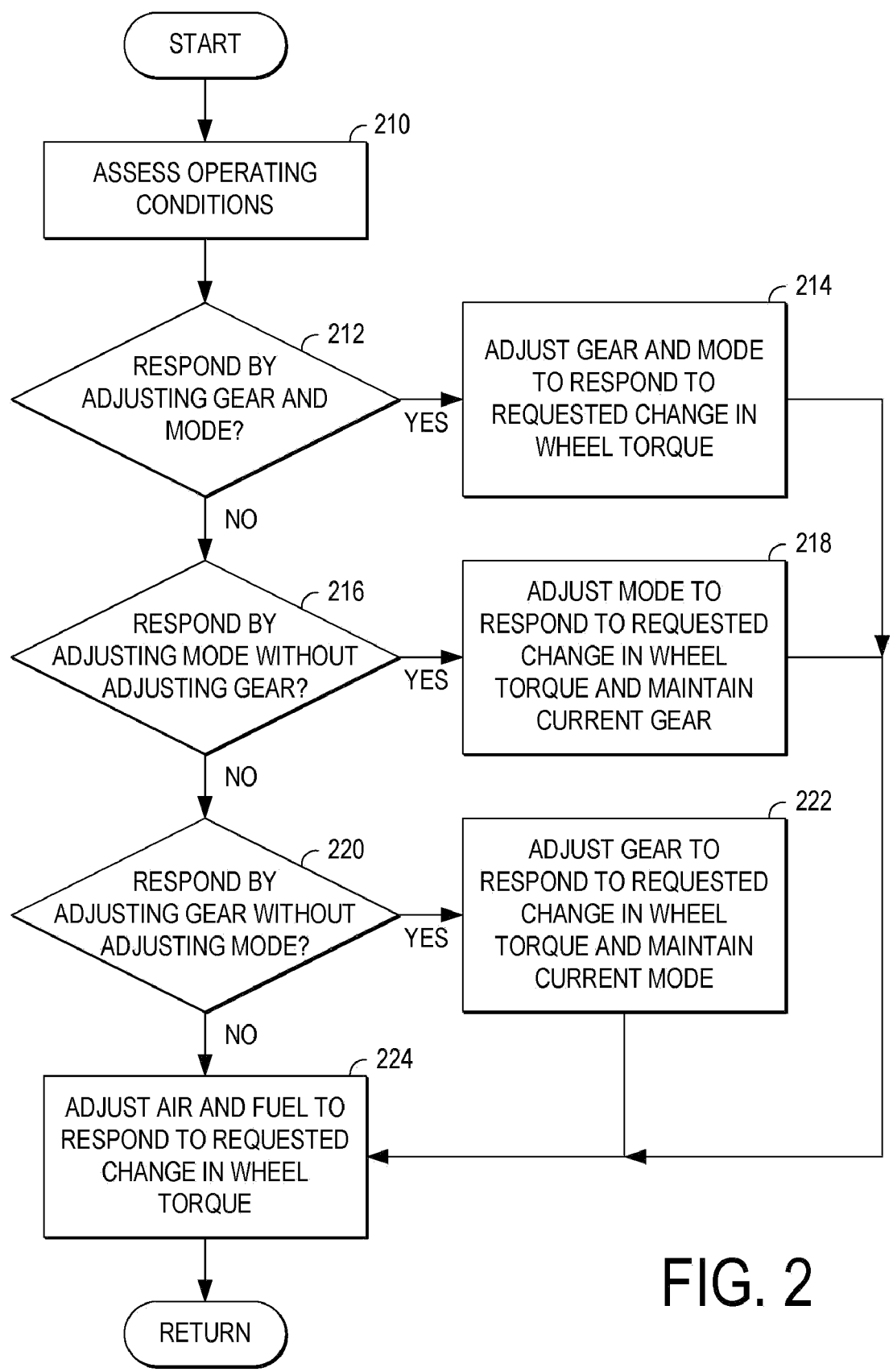
FIGS. 2-4 illustrate flow charts depicting example process flows that may be used to control the propulsion system of FIG. 1.

FIG. 2 illustrates a flow chart depicting an example process flow that may be performed by control system 120. The process flow of FIG. 2 depicts how transitions between the two stroke mode and the four stroke mode may be coordinated with transmission shifting to enable the delivery of a suitable wheel torque for propelling the vehicle.

At 210, one or more operating conditions may be assessed by the control system. These operating conditions may include one or more of engine rotational speed, vehicle speed, an indication of requested wheel torque (e.g. as requested by a vehicle operator), transmission state (e.g. selected gear), current combustion mode of the engine, engine throttle position, engine torque reserve for the current combustion mode, ambient conditions, an indication of engine noise vibration and harshness (NVH), among other operating conditions described with reference to FIG. 8.

As a non-limiting example, the control system may identify a request to increase or decrease the wheel torque of the vehicle. This requested increase or decrease in wheel torque may be communicated to the control system via a user input device such as an accelerator pedal depicted in FIG. 8 at 872.

At 212, it may be judged whether the control system should respond to the requested change in wheel torque by adjusting both the selected gear of the transmission and the combustion mode of the engine. If the answer at 212 is judged yes, the process flow may proceed to 214, where the selected transmission gear and the combustion mode of the engine may be adjusted in response to the operating conditions identified at 210.

As a first example, the control system may perform a down-shift of the transmission (i.e. increase the gear ratio) while transitioning the engine from a two stroke mode to a four stroke mode. By down-shifting the transmission (e.g. increasing the gear ratio) the speed of the engine may be increased through the increased gear ratio, while transitioning the engine to the four stroke mode can be used to reduce the amount of torque produced by the engine. This approach may be used by the control system to respond to a requested increase or decrease in the torque delivered to the drive wheels of the vehicle as will described in greater detail with reference to FIGS. 3 and 4.

As a second example, the control system may down-shift the transmission while transitioning the engine from the four stroke mode to the two stroke mode. The down-shift serves to increase the engine rotational speed, while the transition to the two stroke mode further increases the torque reserve of the engine. This approach may be used by the control system to respond to a requested increase in the torque delivered to the drive wheels of the vehicle.

As a third example, the control system may perform an up-shift of the transmission (i.e. reduce the gear ratio) while transitioning the engine from the two stroke mode to the four stroke mode. The up-shift of the transmission serves to reduce the engine rotational speed while the transition to the four stroke mode can reduce the torque reserve while increasing engine efficiency.

As a fourth example, the control system may perform an up-shift of the transmission while transitioning the engine from the four stroke cycle to the two stroke cycle. Depending on operating conditions, this approach may be used by the control system to respond to a requested increase or decrease in the torque delivered to the drive wheels of the vehicle as will described in greater detail with reference to FIGS. 3 and 4.

Alternatively, if the answer at 212 is judged no, the process flow may instead proceed to 216. At 216, it may be judged whether to respond to a change in the requested wheel torque by adjusting a combustion mode of the engine without adjusting the selected gear of the transmission. If the answer at 216 is judged yes, the process flow may proceed to 218, where the combustion mode of the engine may be adjusted in response to the requested change in wheel torque, while maintaining the currently selected transmission gear.

As a first example, the control system may transition the engine from the two stroke mode to the four stroke mode, while maintaining the currently selected gear ratio. This approach may be used by the control system to respond to a requested decrease in the wheel torque (e.g. tip-out). As a second example, the control system may transition the engine from the four stroke mode to the two stroke mode, while maintaining the currently selected gear ratio. This approach may be used by the control system to respond to a requested increase in the wheel torque (e.g. tip-in).

Alternatively, if the answer at 216 is judged no, the process flow may proceed to 220. At 220, it may be judged whether to respond to a change in the requested wheel torque by adjusting the selected gear of the transmission without adjusting the combustion mode of the engine. If the answer at 220 is judged yes, the process flow may proceed to 222, where the selected transmission gear may be adjusted while maintaining the current combustion mode of the engine.

As a first example, the control system may down-shift the transmission, while maintaining the engine in the two stroke cycle. As a second example, the control system may down-shift the transmission, while maintaining the engine in the four stroke cycle. These approaches may be used by the control system to respond to a requested increase in the torque delivered to the drive wheels of the vehicle. As a third example, the control system may up-shift the transmission, while maintaining the engine in the two stroke cycle. As a fourth example, the control system may up-shift the transmission, while maintaining the engine in the four stroke cycle.

From 214, 218, 222, and 224, the process flow may proceed to 224. At 224, the air and fuel delivered to the engine cylinders may be adjusted to respond to the change in requested wheel torque. From 214, 218, and 222, the adjustment of the air and fuel performed at 224 may be in addition to the adjustments made to the transmission gear and/or engine combustion mode. From 220, the adjustment of the air and fuel performed at 224 may be performed while maintaining the engine combustion mode and selected transmission gear.

As a first example, the air and fuel delivered to the engine cylinders may be increased at 224 to respond to a requested increase in wheel torque, thereby increasing the amount of torque produced by the engine. As another example, the air and fuel delivered to the engine cylinders may be decreased to respond to a requested decrease in wheel torque, thereby decreasing the amount of torque produced by the engine.

The adjustment to the air and fuel delivered to the engine may be performed in accordance with a prescribed air/fuel ratio or air/fuel ratio range. For example, the control system may increase or decrease the amount of air and fuel delivered to the engine cylinders while maintaining a stoichiometric air/fuel ratio, or other suitable ratio. From 224, the process flow may return to 210.

In this way, FIG. 2 provides at least some of the various operations that may be performed by the propulsion system, whereby transmission state and combustion mode of the engine may be coordinated to provide the requested wheel torque to the drive wheels at a given vehicle speed. As will be described in the context of FIG. 5, the engine may be operated in the two stroke mode during a first operating condition and may be operated in the four stroke mode during a second operating condition. As a non-limiting example, the engine may be operated in the two stroke mode at lower engine rotational speeds and may be operated in the four stroke mode at higher engine rotational speeds.

Figure 3:
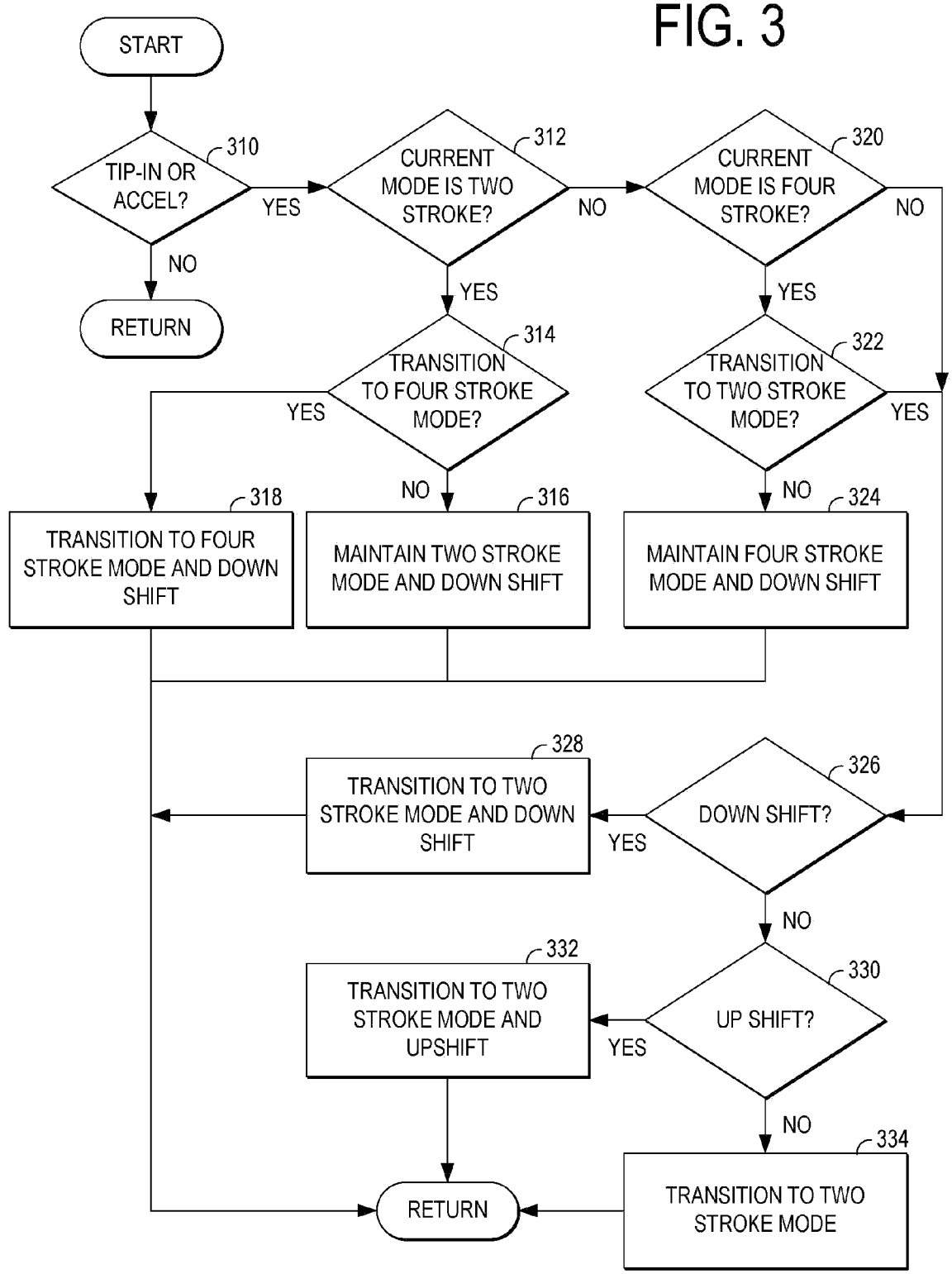

FIG. 3 illustrates a flow chart depicting an example process flow that may be performed in response to a vehicle operator tip-in or requested vehicle acceleration. The process flow of FIG. 3 provides a non-limiting example of the more general process flow depicted in FIG. 2.

Figure 8:
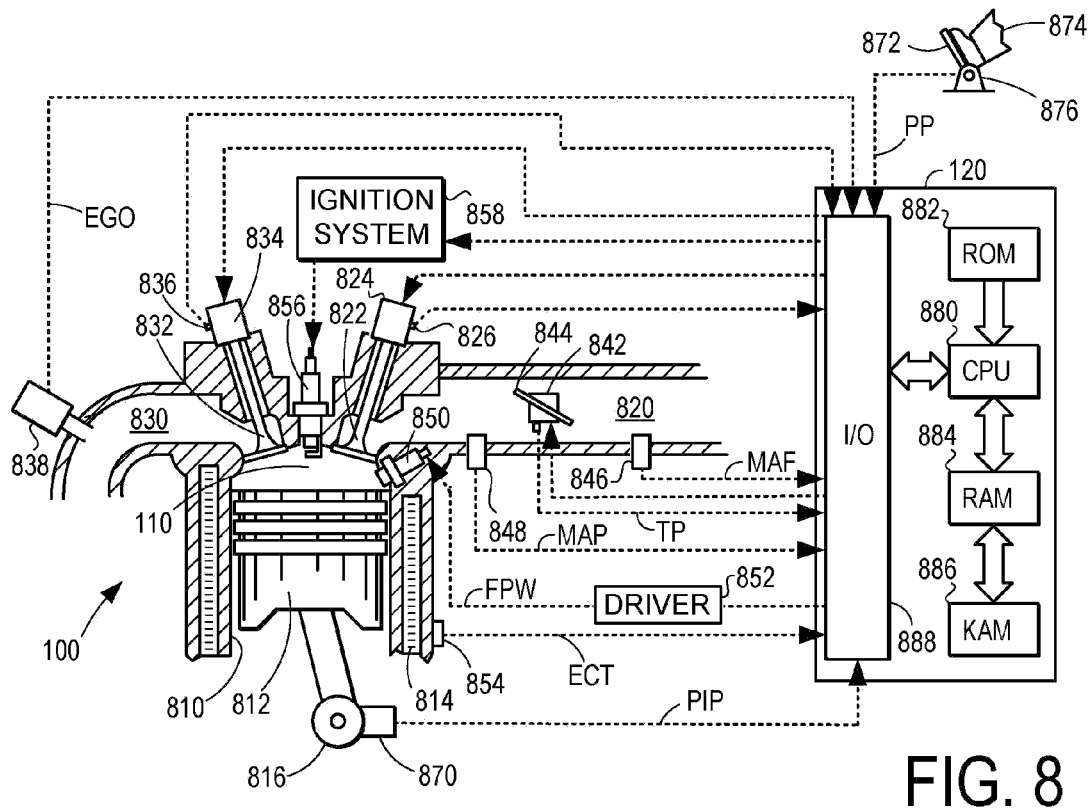
FIG. 8 depicts a detailed view of an example engine cylinder of the propulsion system of FIG. 1.

At 310 it may be judged whether a vehicle operator tip-in has occurred or whether vehicle acceleration is requested. For example, the control system may judge whether a tip-in has occurred based on input from a pedal position sensor as depicted in FIG. 8. If the answer at 310 is judged no, the process flow may return. Alternatively, if the answer at 310 is judged yes, the process flow may proceed to 312. At 312, it may be judged whether the engine is currently operating in the two stroke mode. If the answer at 312 is judged yes, the process flow may proceed to 314.

At 314, it may be judged whether to transition the engine from the two stroke mode to the four stroke mode. The decision to transition the engine to the four stroke mode at 314 may be based on one or more of the magnitude of the tip-in or requested acceleration identified at 310 and at 210, the torque production limits of the engine operating in four stroke mode, the lug limits of the engine while operating in the four stroke mode and two stroke mode, and the over speed limits of the engine while operating in the four stroke mode and the two stroke mode.

As one example, the answer at 314 may be judged no in response to a larger tip-in or a larger requested increase in vehicle speed, and the answer at 314 may be judged yes in response to a smaller tip-in or a smaller requested increase in vehicle speed. Maintaining the engine in the two stroke cycle can enable the engine to output more torque and transitioning the engine to the four stroke cycle can enable the engine to output less torque, while the wheel torque may be increased by down-shifting the transmission.

If the answer at 314 is judged no, the process flow may proceed to 316, where the propulsion system may responds to the tip-in or requested acceleration by down-shifting the transmission while maintaining operation of the engine in the two stroke mode. As the transmission is down-shifted, the wheel torque may be increased while maintaining the engine in the current combustion mode.

Alternatively, if the answer at 314 is judged yes (i.e. a transition to the four stroke cycle is to be performed) the process flow may proceed to 318. At 318, the engine may be transitioned to the four stroke mode and the transmission may be down-shifted in response to the tip-in or vehicle acceleration request. Returning to 312, if the answer is alternatively judged no (i.e. the engine is not currently operating in the two stroke mode) the process flow may proceed to 320. At 320, it may be judged whether the engine is currently operating in the four stroke mode. If the answer at 320 is judged yes, the process flow may proceed to 322.

At 322 it may be judged whether to transition the engine from the four stroke cycle to the two stroke cycle. The decision to transition the engine to the two stroke mode at 322 may be based on one or more of the magnitude of the tip-in or requested acceleration identified at 310 and at 210, the torque production limits of the engine operating in four stroke mode, the lug limits of the engine while operating in the four stroke mode and two stroke mode, and the over speed limits of the engine while operating in the four stroke mode and the two stroke mode.

As one example, the control system may judge whether the tip-in or requested acceleration may be achieved by adjusting only the combustion mode, by adjusting only the transmission gear, or by adjusting both the combustion mode and the transmission gear. The answer at 322 may be judged in response to the magnitude of the tip-in or requested acceleration identified at 310 or 210.

For example, if a transition to the two stroke mode is not to be performed, the process flow may proceed to 324. At 324, the four stroke mode may be maintained by the engine and the transmission may be downshifted. Alternatively, if the answer at 322 is yes, the process flow may proceed to 326 where it may be judged whether to down-shift the transmission. As one example, the control system may identify whether a down-shift is to be performed in response to one or more of the magnitude of the tip-in, the torque production limits of the engine operating in the two stroke mode, the lug limit of the engine operating in the two stroke mode, and the over speed limit of the engine operating in the two stroke mode.

For example, if the engine cannot produce sufficient torque while operating in the two stroke mode to meet the requested wheel torque as indicated by the tip-in, the transmission may be down-shifted. As another example, if the down-shift would increase the engine rotational speed beyond the over speed limit of the engine while operating in the two stroke mode, the down-shift may not be performed.

If the answer at 326 is judged yes, process flow may proceed to 328. At 328, the engine may be transitioned to the two stroke mode from the four stroke mode, and the transmission may be down-shifted. The operation at 328 may be performed by the control system in response to a greater tip-in or larger requested increase in vehicle speed as compared to the operation at 324, since the two stroke mode can provide greater engine output torque than the four stroke mode. Alternatively, if the answer at 326 is judged no (i.e. a transmission down-shift is not to be performed), the process flow may proceed to 330.

At 330, it may be judged whether to perform an up-shift of the transmission in conjunction with the transition to the two stroke mode. The control system may judge whether to perform an up-shift at 330 in response to one or more of the magnitude of the tip-in, the torque production limits of the engine operating in the two stroke mode, the lug limit of the engine while operating in the two stroke mode, and the over speed limit of the engine while operating in the two stroke mode.

For example, if the engine rotational speed is greater than the over speed limit for the two stroke mode before the engine is transitioned to the two stroke mode, the control system may judge that an up-shift is to accompany with the transition. As another example, if the engine rotational speed after the up-shift would exceed the lug limit of the engine while operating in the two stroke mode, the up-shift may not be performed.

If the answer at 330 is judged yes, the process flow may proceed to 332. At 332, the transmission may be up-shifted and the engine may be transitioned to the two stroke mode from the four stroke mode. The transition from the four stroke mode to the two stroke mode enables the propulsion system to achieve the requested wheel torque indicated by the tip-in, even when the transmission is up-shifted.

Alternatively, if the answer at 330 is judged no (i.e. an up-shift is not to be performed), the process flow may proceed to 334. At 334, the engine may be transitioned to the two stroke mode from the four stroke mode while maintaining the currently selected transmission gear, and the engine may be operated to achieve the requested wheel torque indicated by the tip-in. From 316, 318, 324, 328, and 334, the process flow may return to 310.

As described with reference to FIG. 3, the engine may be operated to carry out combustion in a four stroke mode, where in response to a driver tip-in, the engine may be transitioned to a two stroke mode from the four stroke mode and the gear ratio of the transmission may be adjusted. The gear ratio may be adjusted in some examples by up-shifting the transmission as shown at 332 or may be down-shifted in some examples as shown at 328. After these transitions are performed, the engine may be operated to carry out combustion in the two stroke mode to increase the level of torque delivered to drive wheels via the transmission in accordance with the driver tip-in.

Figure 4:
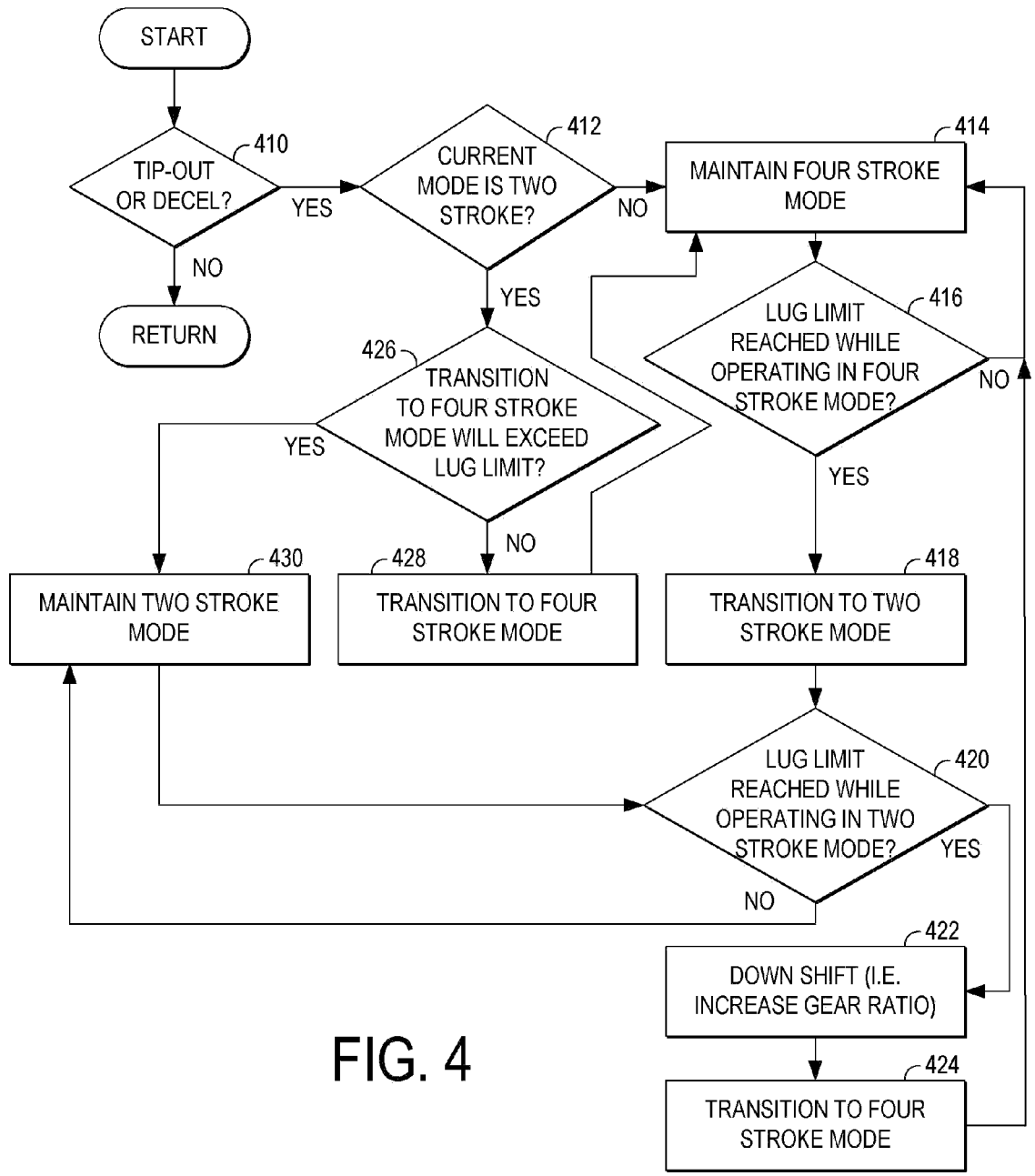

FIG. 4 illustrates a flow chart depicting an example process flow that may be performed in response to a vehicle operator tip-out or requested vehicle deceleration. The process flow of FIG. 4 provides another non-limiting example of the more general process flow depicted in FIG. 2.

At 410 it may be judged whether a vehicle operator tip-out has occurred or whether vehicle deceleration is requested. For example, the control system may judge whether a tip-out has occurred based on input from a pedal position sensor as depicted in FIG. 8. If the answer at 410 is judged no, the process flow may return. Alternatively, if the answer at 410 is judged yes, the process flow may proceed to 412. At 412, it may be judged whether the engine is currently operating in the two stroke mode. If the answer at 412 is judged no, the process flow may proceed to 414.

At 414, the four stroke mode may be maintained while the vehicle is decelerated or tip-out has occurred. At 416, it may be judged whether the engine lug limit of the four stroke mode has been reached. For example, the control system may assess the engine rotational speed as previously described with reference to 210, whereby engine rotational speed may be compared to a lug limit for the four stroke mode that may be stored in memory at the control system. As a non-limiting example, the lug limit for the four stroke mode may be approximately 1100 rpm, or other suitable engine rotational speed.

If the answer at 416 is judged no (e.g. the engine rotational speed is approaching or is greater than the lug limit for the four stroke mode), the process flow may return to 414 where the four stroke mode is maintained throughout the tip-out or vehicle deceleration. Alternatively, if the answer at 416 is judged yes, the process flow may proceed to 418. At 418, the engine may be transitioned to the two stroke mode while the current transmission gear is maintained. Since the combustion frequency of the engine operating in the two stroke mode is approximately twice that of the engine operating in the four stroke mode, the lug limit for the two stroke mode may be approximately half of the lug limit of the four stroke mode. For example, where the lug limit in the four stroke mode is 1100 rpm, the lug limit in the two stroke mode may be 550 rpm. By transitioning the engine from the four stroke mode to the two stroke mode, the engine may prolong operation in the currently selected gear during a deceleration of the vehicle.

In this way, when the engine is rotating or operating at a lower engine rotational speed, the vehicle speed may be reduced by increasing a number of strokes performed by the engine per combustion cycle (e.g. transition from two stroke to four stroke) while increasing a gear ratio of the transmission (e.g. down-shifting); and when the engine is rotating or operating at a higher engine rotational speed, the vehicle speed may be reduced by reducing a number of strokes performed by the engine per combustion cycle (e.g. transition from four stroke to two stroke) while maintaining the transmission at a selected gear ratio.

As will be described with reference to FIG. 5, a similar approach may be used for increasing vehicle speed. For example, when the engine is rotating at a higher engine rotational speed, the vehicle speed may be increased by reducing the number of strokes performed by the engine per combustion cycle while reducing a gear ratio of the transmission (e.g. up-shifting); and when the engine is rotating at the lower engine rotational speed, the vehicle speed may be increased by increasing the number of strokes performed by the engine per combustion cycle while maintaining the transmission at the selected gear ratio.

From 418, the process flow may proceed to 420. At 420, it may be judged whether the lug limit has been reached while the engine is operating in the two stroke mode. As described with reference to 416, the control system may compare the current engine rotational speed to the lug limit for the two stroke mode stored in memory to determine whether the engine rotational speed is approaching or exceeding the lug limit for the particular combustion mode. If the answer at 420 is no, the process flow may proceed to 430 where the two stroke mode may be maintained. From 430, the process flow may return to 420.

Alternatively, if the answer at 420 is judged yes (e.g. the engine rotational speed is approaching or is less than the lug limit of the two stroke mode), the process flow may proceed to 422. At 422 and 424, the transmission may be down-shifted and the engine may be transitioned to the four stroke mode. In some embodiments, the control system may have a preference for the four stroke mode over the two stroke mode during deceleration of the vehicle in order to conserve fuel and further reduce engine torque. From 424, the process flow may return to 414.

Returning to 412, if the answer is alternatively judged no (i.e. the current mode is the two stroke mode), the process flow may proceed to 426. At 426, it may be judged whether the engine rotational speed is less than the lug limit of the four stroke mode. If the answer is judged no, the engine may be transitioned to the four stroke mode at 428 to conserve fuel and reduce engine torque in response to the tip-out or during the vehicle deceleration event. From 428, the process flow may proceed to 414.

Alternatively, if the answer at 426 is judged yes (i.e. that engine rotational speed is approaching or below the lug limit of the four stroke mode), the process flow may proceed to 430 where the two stroke mode may be maintained. In this way, the control system may be configured to transition the engine to the four stroke mode in response to a tip-out or requested vehicle deceleration if the lug limit of the four stroke mode is not exceeded, while the two stroke mode may be used to maintain the currently selected gear where downshift would otherwise be performed. By maintaining the currently selected gear to a greater extent, tip-outs of relatively short temporal nature may be responded to without requiring a transmission shift. Thus, where a brief tip-out is followed by a subsequent tip-in, at least two transmission shifts may be avoided, namely a first down-shift from the initially selected gear followed by a second up-shift back to the initially selected gear may be eliminated by utilizing the two stroke mode.

Figure 5:
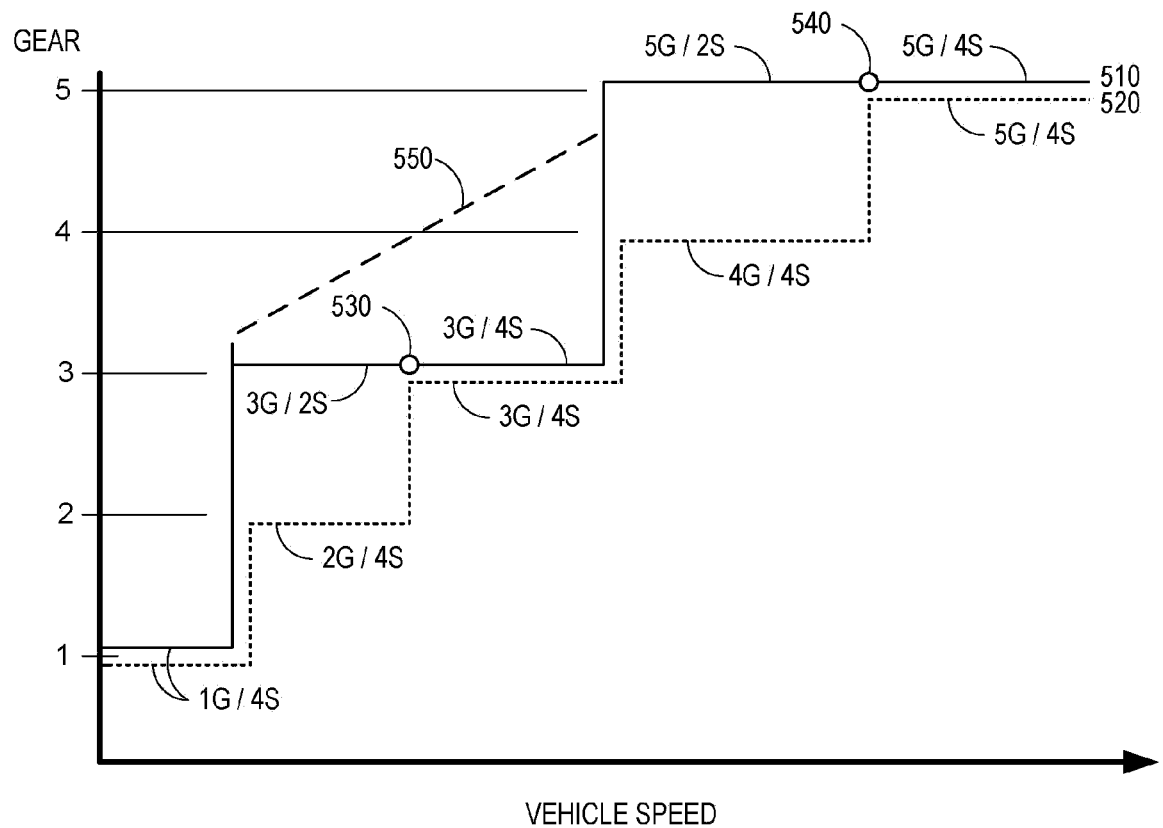
FIG. 5 depicts an example transmission shift schedule.

FIG. 5 depicts example transmission shift schedules, which illustrate the process flow of FIGS. 2-4. A first shift schedule for the engine selectively operated in the two stroke mode and the four stroke mode is depicted at 510 as a solid line. The second shift schedule for the engine operating in only the four stroke mode is depicted at 520 as a broken line.

At lower vehicle speeds, the engine may be operated in the four stroke mode (4S) while the first gear transmission gear (1G) is selected. At higher vehicle speeds, the transmission may be up-shifted (e.g. gear ratio may be reduced). As illustrated by line 520, the transmission may be up-shifted to a second gear (2G) while the engine continues to operate in the four stroke cycle. By contrast, line 510 illustrates how a transition to the two stroke mode can enable the transmission to be up-shifted to a greater extent while delivering the same or similar level of wheel torque at a given engine rotational speed.

For example, the transmission may be up-shifted to third gear (3G) rather than second gear (2G) since the engine has sufficient torque reserve when operating in two stroke mode to enable the second gear (2G) to be optionally skipped. Therefore, by reducing the number of strokes carried out by the engine per combustion cycle in coordination with an up-shift, an intermediate gear of the transmission may be optionally eliminated or omitted, thereby reducing the cost, weight, and complexity of the transmission as well as reducing the number of shifts that are performed by the transmission during an acceleration event.

For example, if the engine is instead operated with a constant number of strokes per combustion event, such as with reference to the four stroke cycle depicted by line 520, intermediate transmission gears may be required to provide the requested wheel torque across a range of vehicle speeds. Line 520 further depicts how the transmission may be up-shifted to third gear (3G) at even higher speeds while the four stroke operation is maintained. By contrast, operating point 530 depicts how the engine may be transitioned once again from the two stroke mode to the four stroke mode for operation at higher engine rotational speeds.

Line 550 illustrates how engine rotational speed may vary in proportion to vehicle speed across a selected gear ratio such as 3G. As a non-limiting example, operating point 530 may represent the lug limit of the engine operating in the four stroke cycle, or may represent the shift point that is at an engine rotational speed that is greater than the lug limit of the engine while operating in the four stroke cycle. As depicted by line 550, the engine may be operated in the two stroke mode at lower engine rotational speeds and may be operated in the four stroke mode at higher engine rotational speeds.

At even higher engine rotational speeds, transition of the engine from the four stroke mode (4S) to the two stroke mode (2S) depicted by line 510 can enable the transmission to proceed directly from third gear (3G) to fifth gear (5G), thereby skipping fourth gear. Upon reduction of the gear ratio from 3G to 5G, the engine speed may be reduced and two stroke mode may be performed. Since the engine is able to produce greater engine torque in the two stroke mode than the four stroke mode, the engine can still deliver the requested wheel torque even when greater reduction in the gear ratio are performed as a consequence of the up-shift.

By contrast, line 520 depicts how the four stroke engine utilizes an up-shift to an intermediate fourth gear (4G) before up-shifting again to the fifth gear (5G) in order to deliver the requested wheel torque across the vehicle speed range. As shown at operating point 540 of line 510, the multi-stroke engine may be transitioned once again from the two stroke mode (2S) to the four stroke mode (4S) while maintaining the transmission state in fifth gear.

As can be demonstrated by FIG. 5, the vehicle speed may be increased by shifting the transmission differently depending on whether the engine is transitioned between the two stroke and four stroke modes or whether the engine maintains the four stroke mode. The example of FIG. 5, the multi-stroke operation provided by the transitions between four stroke and two stroke cycles enables a reduction in the number of shifts performed by the transmission (e.g. by skipping intermediate gears), and may optionally enable at least some of the intermediate gears to be eliminated or omitted from the transmission.

In some embodiments, these intermediate gears may be retained in the transmission so that failure or degradation of the engine's ability to be transitioned between the four stroke mode and the two stroke mode can enable the engine to still deliver the requested wheel torque across the entire range of vehicle speeds by utilizes the intermediate gears as described with reference to line 520.

The vehicle speed may be reduced in a similar manner as described above with reference to the vehicle speed increase. As one example, where the vehicle is initially operating at higher speeds, the engine may be transitioned to the two stroke mode from the four stroke mode as the engine approaches its lug limit in the four stroke mode, rather than performing a down-shift. For example, where the engine is initially operating in the four stroke cycle (4S) and the transmission is in fifth gear (5G), the propulsion system can respond to a reduction in vehicle speed by transitioning the engine to the two stroke cycle as indicated by line 510 at 540. By contrast, line 520 depicts how the engine operating exclusively in the four stroke mode may utilize a down-shift of the transmission as indicated by the transition from fifth gear (5G) to fourth gear (4G).

Note that where the intermediate gears are retained in the transmission, the engine may be optionally operated in a four stroke mode during deceleration of the vehicle in order to increase fuel efficiency, whereby the intermediate gears are used to maintain the engine rotational speed within the lug limits and over speed limits of the four stroke mode.

FIG. 5 further depicts how the transmission may be shifted between a lower gear ratio and a higher gear ratio in response to a change of an operating condition, such as vehicle speed, engine rotational speed, or operator requested engine torque as indicated by accelerator pedal position. Furthermore, FIG. 5 depicts how the number of strokes performed by the engine per combustion cycle may be increased during a shift of the transmission from the lower gear ratio to the higher gear ratio; and the number of strokes performed by the engine per combustion cycle may be reduced during a shift of the transmission from the lower gear ratio to the higher gear ratio.

Figure 6:
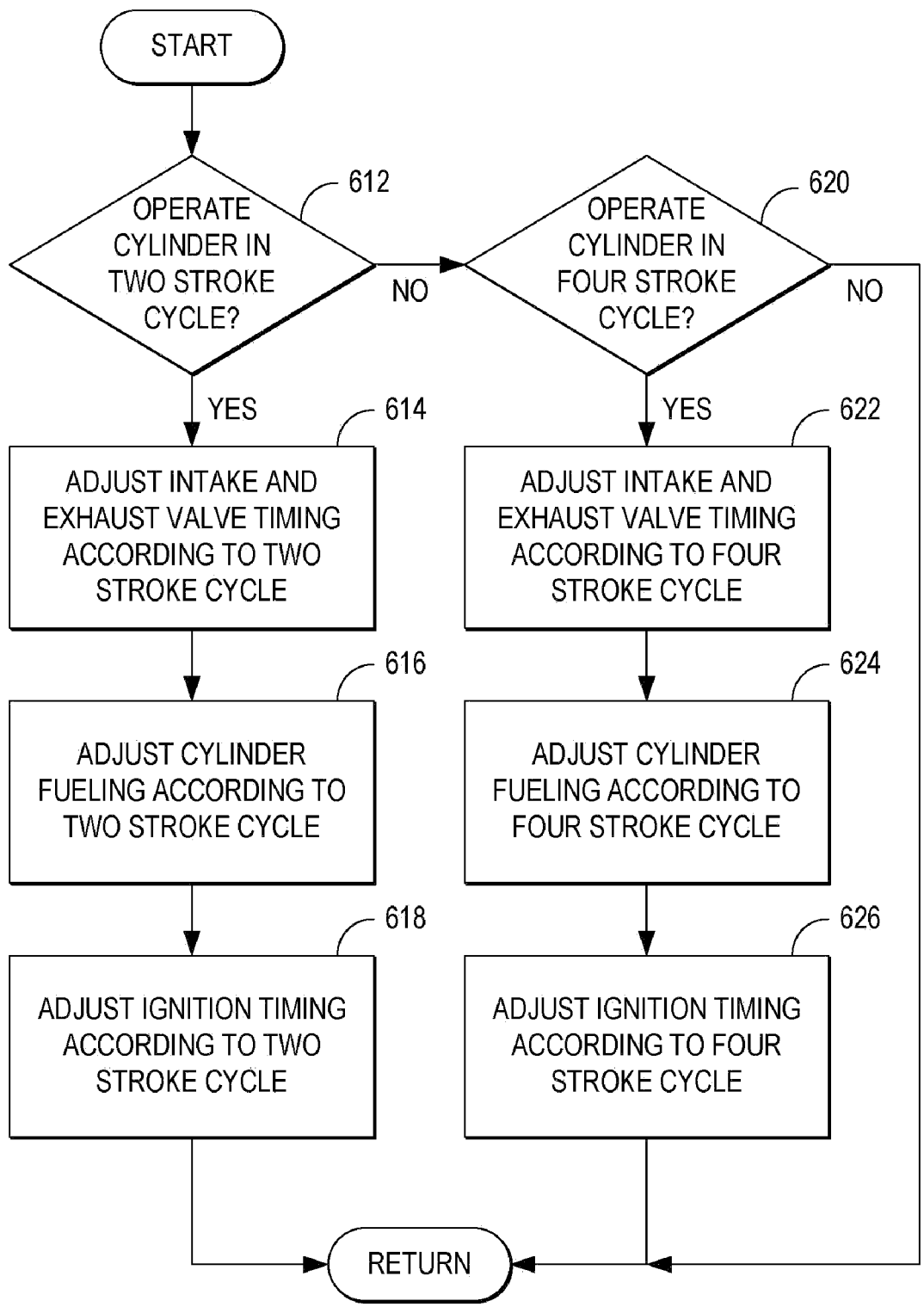
FIG. 6 illustrates a flow chart depicting an example process flow that may be used to control the propulsion system of FIG. 1.

FIG. 6 illustrates a flow chart depicting an example process flow that may be performed by the control system to transition the cylinders between a two stroke cycle and a four stroke cycle. At 612 it may be judged whether to operate a cylinder of the engine in the two stroke cycle in accordance with the process flow of FIGS. 2-4. If the answer at 612 is yes, the control system may adjust one or more of the cylinder's intake and/or exhaust valve timing at 614, the cylinder fueling at 616, and the ignition timing at 618 according to the two stroke cycle.

Alternatively, if the answer at 612 is judged no, the process flow may proceed to 620 where it may be judged whether to operate the cylinder in the four stroke cycle in accordance with the process flow of FIGS. 2-4. If the answer at 620 is yes, the process flow may adjust one or more of the cylinder's intake and/or exhaust valve timing at 622, the cylinder fueling at 616, and the ignition timing at 618 according to the four stroke cycle. Furthermore, in some embodiments, throttle position may be adjusted in response to the particular operating mode of the engine to vary intake airflow supplied to the cylinders that are carrying out combustion.

Referring also to FIGS. 7A and 7B, timing diagrams are depicted for an example cylinder operating in a two stroke cycle and a four stroke cycle, respectively. An indication of time is provided along the horizontal axes of FIGS. 7A and 7B with reference to piston position. Top dead center (TDC) and bottom dead center (BDC) represent the piston position relative to the cylinder as it reciprocates throughout operation of the engine. A comparison of FIGS. 7A and 7B illustrates how the intake and exhaust valves of the cylinder may be opened twice as often or at a higher frequency in the two stroke cycle as the four stroke cycle. Further, fuel may be delivered to the engine at twice the frequency during the two stroke cycle as the four stroke cycle. For example, the cylinder may be fueled approximately every 360 crank angle degrees during the two stroke cycle and approximately every 720 degrees during the four stroke cycle. Further still, ignition of the air and fuel charge within the cylinder may be performed around each TDC (e.g. approximately every 360 crank angle degrees) in the two stroke cycle, and may be performed around every other TDC in the four stroke cycle (e.g. approximately every 720 crank angle degrees).

FIG. 8 illustrates a schematic depiction of an example cylinder 110 of engine 100 including the intake and exhaust system components that interface with the cylinder. Note that cylinder 110 may correspond to one or more of the previously described multi-stroke cylinders. Cylinder 110 is at least partially defined by combustion chamber walls 810 and piston 812. Piston 812 may be coupled to a crankshaft 816 via a crank arm, along with other pistons of the engine. Crankshaft 816 may be operatively coupled with drive wheel 130 via transmission 140 as depicted in FIG. 1.

Cylinder 110 may receive intake air via an intake passage 820. Intake passage 820 may also communicate with other cylinders of engine 100. Intake passage 820 may include a throttle 842 including a throttle plate 844 that may be adjusted by control system 120 to vary the flow of intake air that is provided to the engine cylinders. Cylinder 110 can communicate with intake passage 820 via one or more intake valves 822. As a non-limiting example, these intake valves may be configured as intake poppet valves that are arranged near the top or upper region of cylinder 110. However, in other embodiments, these intake valves may be arranged in a lower region of the cylinder.

An intake valve actuator 824 may comprise a valve actuation system that is operatively coupled with one or more of the poppet intake valves. Intake valve actuator 824 may enable the opening and closing timing of one or more of the intake valves to be adjusted to enable operation of the engine in the two stroke mode and the four stroke mode. For example, intake valve actuator 824 may be operated to increase the frequency at which the intake poppet valves are opened to perform the two stroke mode and reduce the frequency at which the intake poppet valves are opened to perform the four stroke mode. In some embodiments, intake valve actuator 824 may include a cam profile switching device to enable different cams to be used to actuate the intake valves during each of the two stroke mode and the four stroke mode. In other embodiments, intake valve actuator 824 may include an electromagnetic valve actuator (EVA) for controlling the opening and closing timing of one or more of the intake valves.

Cylinder 110 may exhaust products of combustion via an exhaust passage 830. Cylinder 110 can communicate with exhaust passage 830 via one or more exhaust valves 832. As a non-limiting example, these exhaust valves may be configured as exhaust poppet valves that are arranged near the top or upper region of cylinder 110. An exhaust valve actuator 834 may further comprise the valve actuation system that is operatively coupled with one or more of the poppet exhaust valves. Exhaust valve actuator 834 may enable the opening and closing timing of one or more of the exhaust valves to be adjusted to enable operation of the engine in the two stroke mode and the four stroke mode. For example, exhaust valve actuator 834 may be operated to increase the frequency at which the exhaust poppet valves are opened to perform the two stroke mode and reduce the frequency at which the exhaust poppet valves are opened to perform the four stroke mode. In some embodiments, exhaust valve actuator 834 may include a cam profile switching device to enable the use of different cams to actuate the exhaust valves during each of the two stroke mode and the four stroke mode. In other embodiments, exhaust valve actuator 834 may include an electromagnetic valve actuator (EVA) for controlling the opening and closing timing of one or more of the exhaust valves.

In some embodiments, cylinder 110 may optionally include a spark plug 856, which may be actuated by an ignition system 858. A fuel injector 850 may be provided in the cylinder to deliver fuel directly thereto. However, in other embodiments, the fuel injector may be arranged within intake passage 820 upstream of intake valve 822. Fuel injector 850 may be actuated by a driver 852.

A non-limiting example of control system 120 is depicted schematically in FIG. 8. Control system 120 may include a processing subsystem (CPU) 880, which may include one or more processors. CPU 880 may communicate with memory, including one or more of read-only memory (ROM) 882, random-access memory (RAM) 884, and keep-alive memory (KAM) 886. Storage medium read-only memory 882 can be programmed with computer readable data representing instructions executable by processing subsystem 880 for performing the methods and process flows described herein as well as other variants that are anticipated but not specifically listed.

CPU 880 can communicate with various sensors and actuators of engine 100 via an input/output device 888. As a non-limiting example, these sensors may provide operating condition information to the control system, and may include: an indication of mass airflow (MAF) through intake passage 820 via sensor 846, an indication of manifold air pressure (MAP) via sensor 848, an indication of throttle position (TP) via throttle 842, an indication of engine coolant temperature (ECT) via sensor 854 which may communicate with coolant passage 814, an indication of engine rotational speed (PIP) via sensor 870, an indication of exhaust gas oxygen content (EGO) via sensor 838, an indication of a request or input (PP) from vehicle operator 874 via position sensor 876 of pedal 872, an indication of intake valve position via sensor 826, and an indication of exhaust valve position via sensor 836, among others.

Furthermore, the control system may control operation of the engine 100, including cylinder 110 via one or more of the following actuators: driver 852 to vary fuel injection timing and quantity, ignition system 858 to vary spark timing, intake valve actuator 824 to vary intake valve timing, exhaust valve actuator 834 to vary exhaust valve timing, and throttle 842 to vary the position of throttle plate 844, among others. Note that intake and exhaust valve actuators 824 and 834 may include electromagnetic valve actuators (EVA) and/or cam-follower based actuators.

Figure 9A:
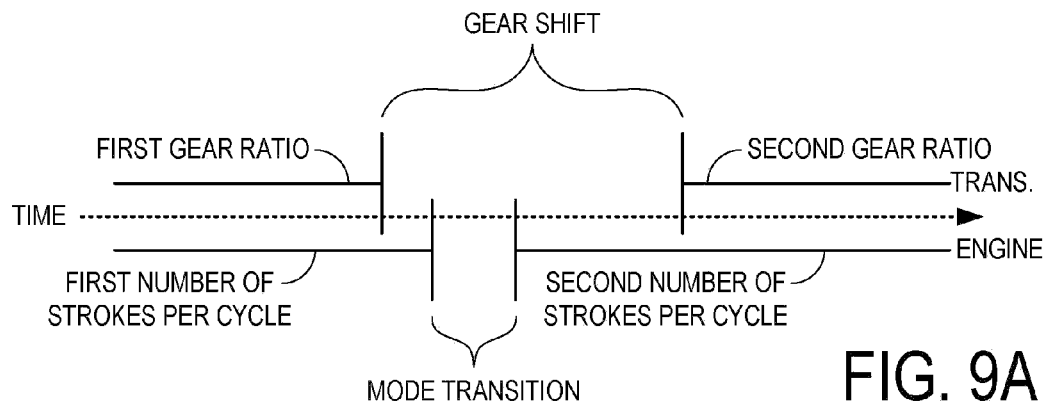
FIGS. 9A, 9B, and 9C are timelines depicting how the combustion mode of the engine may be adjusted during a transmission shift.
Figure 9B:
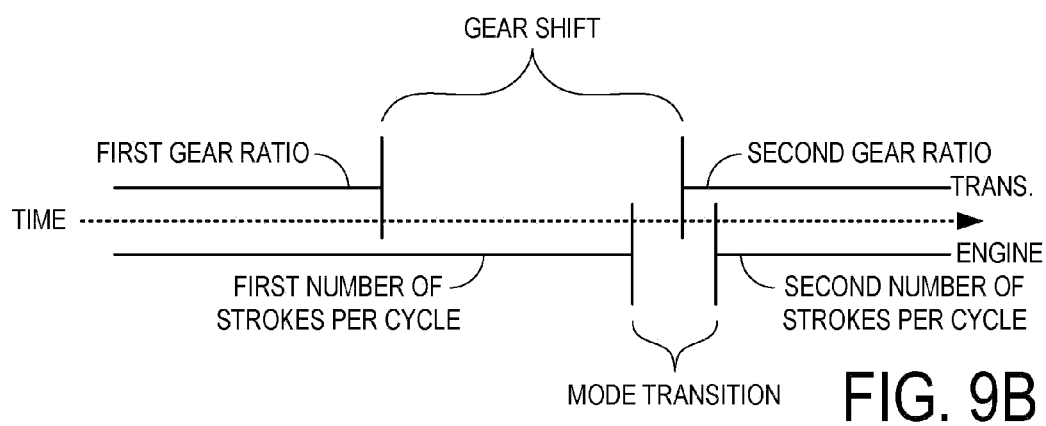
Figure 9C:
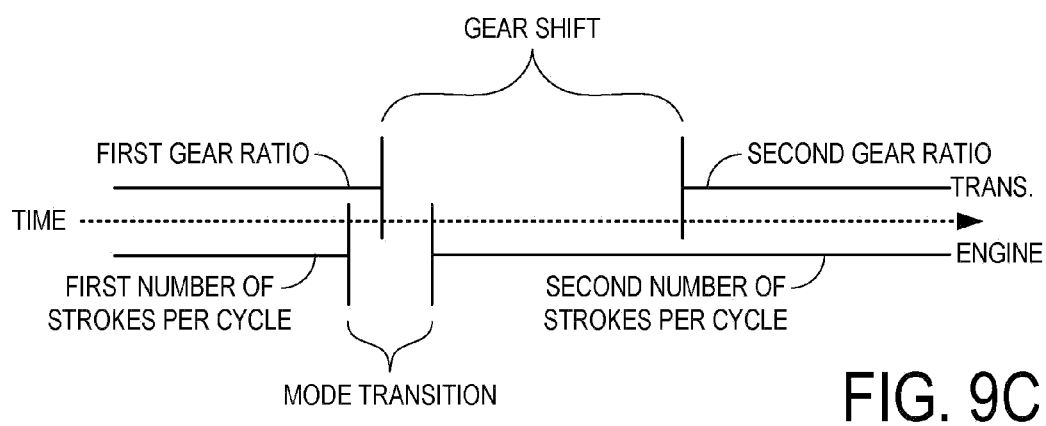

FIGS. 9A, 9B, and 9C are timelines depicting how the combustion mode of the engine may be adjusted during a transmission shift. In each of these examples, the transmission is adjusted from a first gear ratio to a second gear ratio by an intermediate gear shift. The first gear ratio may be lower or higher than the second gear ratio. During the gear shift, the engine combustion mode is transitioned from a mode where a first number of strokes are performed per cycle to a mode where a second number of strokes are performed per cycle via an intermediate mode transition. For example, the engine may be transitioned from a two stroke cycle to a four stroke cycle, or vice-versa. As shown in FIGS. 9A, 9B, and 9C, the mode transition may be performed more rapidly than the gear shift, at least in some examples.

As shown in FIG. 9A, the mode transition may be initiated after the gear shift is initiated, where the mode shift is completed before the gear shift is completed. Alternatively, as shown in 9B, the mode shift may be initiated before the gear shift is initiated, but before the gear shift is completed, where the mode shift may be completed after the gear shift is completed. Alternatively, as shown in FIG. 9C, the mode shift may be initiated before the gear shift is initiated, where the mode shift may be completed after the gear shift is initiated, but before the gear shift is completed. Thus, as demonstrated by FIGS. 9A, 9B, and 9C, the mode transition may be performed during the gear shift.

Note that the example control and estimation process flows included herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a propulsion system for a vehicle, said propulsion system including an internal combustion engine coupled to one or more drive wheels of the vehicle via a transmission, the method comprising:
   operating the engine to produce an engine output;
   transferring the engine output to said one or more drive wheels via the transmission; and
   adjusting a number of strokes performed by the engine per combustion cycle while shifting the transmission between different gear ratios, where said adjusting the number of strokes performed by the engine per combustion cycle is initiated after said shifting between the different gear ratios is initiated and before completion of said shifting between the different gear ratios; and where said adjusting the number of strokes performed by the engine per combustion cycle is completed after said shifting between the different gear ratios is completed.

2. The method of claim 1, where said adjusting the number of strokes performed by the engine per combustion cycle includes reducing the number of strokes performed by the engine per combustion cycle while shifting the transmission from a higher gear ratio to a lower gear ratio.

3. The method of claim 2, where said reducing the number of strokes performed by the engine per combustion cycle includes transitioning the engine from a four stroke cycle to a two stroke cycle.

4. The method of claim 3, further comprising, transitioning the engine from the two stroke cycle to the four stroke cycle in response to an increase in engine rotational speed while maintaining the transmission in the lower gear ratio.

5. The method of claim 1, where said adjusting the number of strokes performed by the engine per combustion cycle includes increasing the number of strokes performed by the engine per combustion cycle while shifting the transmission from a lower gear ratio to a higher gear ratio.

6. The method of claim 5, where said increasing the number of strokes performed by the engine per combustion cycle includes transitioning the engine from a two stroke cycle to a four stroke cycle.

7. The method of claim 6, further comprising, transitioning the engine from the four stroke cycle to the two stroke cycle in response to a reduction in engine rotational speed while maintaining the transmission in the higher gear ratio.

8. A method for a vehicle propulsion system with an engine coupled to a drive wheel via a transmission, comprising:
   operating the engine in a four-stroke combustion mode;
   responsive to a driver tip-in, transitioning the engine to a two-stroke combustion mode from the four-stroke mode and increasing a transmission gear ratio; and then
   continuing engine operation in the two-stroke mode to increase a torque level delivered to said drive wheel in accordance with said driver tip-in.

9. The method of claim 8, where said transitioning the engine to the two-stroke mode from the four-stroke mode is initiated before initiating increasing the transmission gear ratio and is completed before completing said increasing the gear ratio.

10. A vehicle propulsion system, comprising:
    an internal combustion engine, including poppet intake valves;
    a plurality of drive wheels;
    a transmission operatively coupling the engine to said plurality of drive wheels; and a control system configured to:
operate the engine to carry out combustion in a four stroke mode;
in response to a driver tip-in, reduce a gear ratio of the transmission and transition the engine to a two stroke mode from the four stroke mode by increasing an opening frequency of the intake poppet valves; and
after said transition, operate the engine to carry out combustion in the two stroke mode to increase a level of torque delivered to one or more of said plurality of drive wheels via the reduced gear ratio of the transmission in accordance with said driver tip-in, where the control system is further configured to maintain the engine operating in the four stroke mode in response to a driver tip-out; and transition the engine to the two stroke mode after said driver tip-out when the engine rotational speed decelerates to a first lug limit while maintaining the transmission in a selected gear ratio.

11. The vehicle propulsion system of claim 10, further comprising a valve actuation system operatively coupled with the poppet intake valves; where the control system is configured to increase the opening frequency of the intake poppet valves via the valve actuation system; and where the valve actuation system includes one of a cam profile switching system or an electromagnetic valve actuation system.

12. The vehicle propulsion system of claim 10, where the control system is further configured to operate the engine to carry out combustion in the two stroke mode at lower engine rotational speeds after the gear ratio of the transmission has been reduced; and transition the engine to the four stroke mode from the two stroke mode at higher engine rotational speeds after the gear ratio of the transmission has been reduced.

* * * * *